United States Patent [19]

Distler

[11] 3,945,022

[45] Mar. 16, 1976

[54] LIQUID JET RECORDER

[75] Inventor: Walter Distler, Erlangen, Germany

[73] Assignee: Siemens Aktiengesellschaft, Erlangen, Germany

[22] Filed: Sept. 30, 1974

[21] Appl. No.: 511,033

[30] Foreign Application Priority Data

Oct. 1, 1973 Germany .......................... 2349307

[52] U.S. Cl. .................. 346/75; 197/68; 346/139 R

[51] Int. Cl.² ....................... G01D 15/24; B41J 3/04

[58] Field of Search .. 346/75, 139 R, 139 A, 139 B, 346/140; 197/48–55, 65, 68

[56] References Cited

UNITED STATES PATENTS

| | | | |
|---|---|---|---|
| 3,416,153 | 12/1968 | Hertz et al. | 346/75 |
| 3,472,352 | 10/1969 | Kondur | 197/49 |
| 3,673,601 | 6/1972 | Hertz | 346/75 |

*Primary Examiner*—Joseph W. Hartary
*Attorney, Agent, or Firm*—Haseltine, Lake & Waters

[57] ABSTRACT

A liquid jet recorder with at least one nozzle, which is connected to a pressure medium conduit for ejection of an electrically-conductive recording liquid onto a recording carrier, with at least one control electrode encompassing the liquid jet for disintegrating the liquid jet into drops, and a signal source for charging the liquid drops which is connectable between the control electrode and the liquid jet, so that the drops repel each other and disintegrate into a vapor cloud, and including means for generating a relative motion between the jet nozzle and the recording carrier in two mutually perpendicular directions in the context of forming a linewise image recording, in which a recorder unit consisting of the nozzle and control electrode is a component of a recorder carriage movable along rails. For the displacement of the recorder carriage there is provided a motor-driven conveying belt extending in the longitudinal direction of the rails, and an electrical coupling magnet for connection of the recorder carriage thereto, and wherein the motor only provides a single conveying direction, while for the return of the recorder carriage from an end position attained by means of the motor achieved into an initial position at the recording carriage there is provided spring-loaded return member whose spring is adapted to be tensioned upon the motorized movement of the carriage.

2 Claims, 3 Drawing Figures

LIQUID JET RECORDER

FIELD OF THE INVENTION

The present invention relates to a fluid or liquid jet recorder.

DISCUSSION OF THE PRIOR ART

A liquid jet recorder with at least one nozzle, which is connected to a pressure medium conduit for ejection of an electrically-conductive recording liquid onto a recording carrier, with at least one control electrode encompassing the liquid jet disintegrating into drops, and a signal source for charging the liquid drops which is connectable between the control electrode and the liquid jet, so that the drops repel each other and disintegrate into a vapor cloud, and including means for generating a relative motion between the jet nozzle and the recording carrier in two mutually perpendicular directions in the context of forming a linewise image recording, in which a recorder unit consisting of the nozzle and control electrode is a component of a recorder carriage movable along rails, which for the movement within a predetermined range thereof is coupled to an electromotor, and in which the recording carrier is movable only in a direction extending in perpendicular to the direction of movement of the recorder carriage is described in U.S. Pat. No. 3,416,153. In this known liquid jet recorder it becomes possible to effect a modulation of the liquid jet between the nozzle and the recording carrier through applying a suitable voltage between the recording liquid and the control electrode. The known liquid jet recorder thus facilitates the recording of an image constituted of collective lines on a recording carrier. In an embodiment of the known liquid jet carrier, the recording carrier is tensioned on the surface of a rotatably supported drum. The drum is rotated about its axis in synchronous motion with line impulses transmitted from an image transmitter. The unmodulated liquid jet impinges perpendicularly against the recording carrier. The image signal thereby is imparted to the control electrode for effecting a linewise image recording.

The relative motion between the jet nozzle and the recording carrier in two mutually perpendicular directions required for linewise image recording is accomplished in the present state of the art, in that the drum which supports the recording carrier is rotated and the recording arrangement is displaced in a longitudinal direction relative to the drum. With respect to the precise construction of the actuating mechanism for the recording arrangement, nothing may be ascertained from the above-mentioned U.S. patent.

SUMMARY OF THE INVENTION

Accordingly, it is an object of the present invention to provide a liquid jet recorder of the above-mentioned type, which facilitates, by means of a simple and compact construction, a linewise picture recording.

The object is inventively achieved in that for the displacement of the recorder carriage there is provided a motor-driven conveying belt extending in the longitudinal direction of the rails, and an electrical coupling magnet for connection of the recorder carriage thereto, and wherein the motor only provides a single conveying direction, while for the return of the recorder carriage from an end position attained by means of the motor achieved into an initial position at the recording carriage there is provided spring-loaded return member whose spring is adapted to be tensioned upon the motorized movement of the carriage.

The invention facilitates that a particularly simple return conveyance to the initial position of the recorder carriage may be achieved upon reaching the end position. This return conveyance is effected particularly rapidly when a disconnection of the recorder carriage from the conveying belt is effected upon reaching of the end position.

In another aspect of the invention, the recorder includes structure which, in a particularly simple manner, will prevent a hard impact of the recorder carriage against a stop determining the initial position upon the reconveyance thereof from the end position to the initial position. The coupling magent in this embodiment effects a short term braking of the recorder carriage prior to reaching the initial position. Within the scope of the invention, a plurality of switches may also be present for exciting the coupling magnet during the return conveyance of the recorder carriage from the end position to the initial position, which are actuated in sequence. A greater number of switches are employed when the image height if variable, meaning when in any desired position the recorder carriage may be disconnected, inasmuch as in each instance, a soft braking is afforded the recording carriage.

BRIEF DESCRIPTION OF THE DRAWINGS

Further details and advantages of the invention may now be ascertained from the following description of an exemplary embodiment thereof, taken in conjunction with the accompanying drawings; in which.

DETAILED DESCRIPTION

Figure 1:
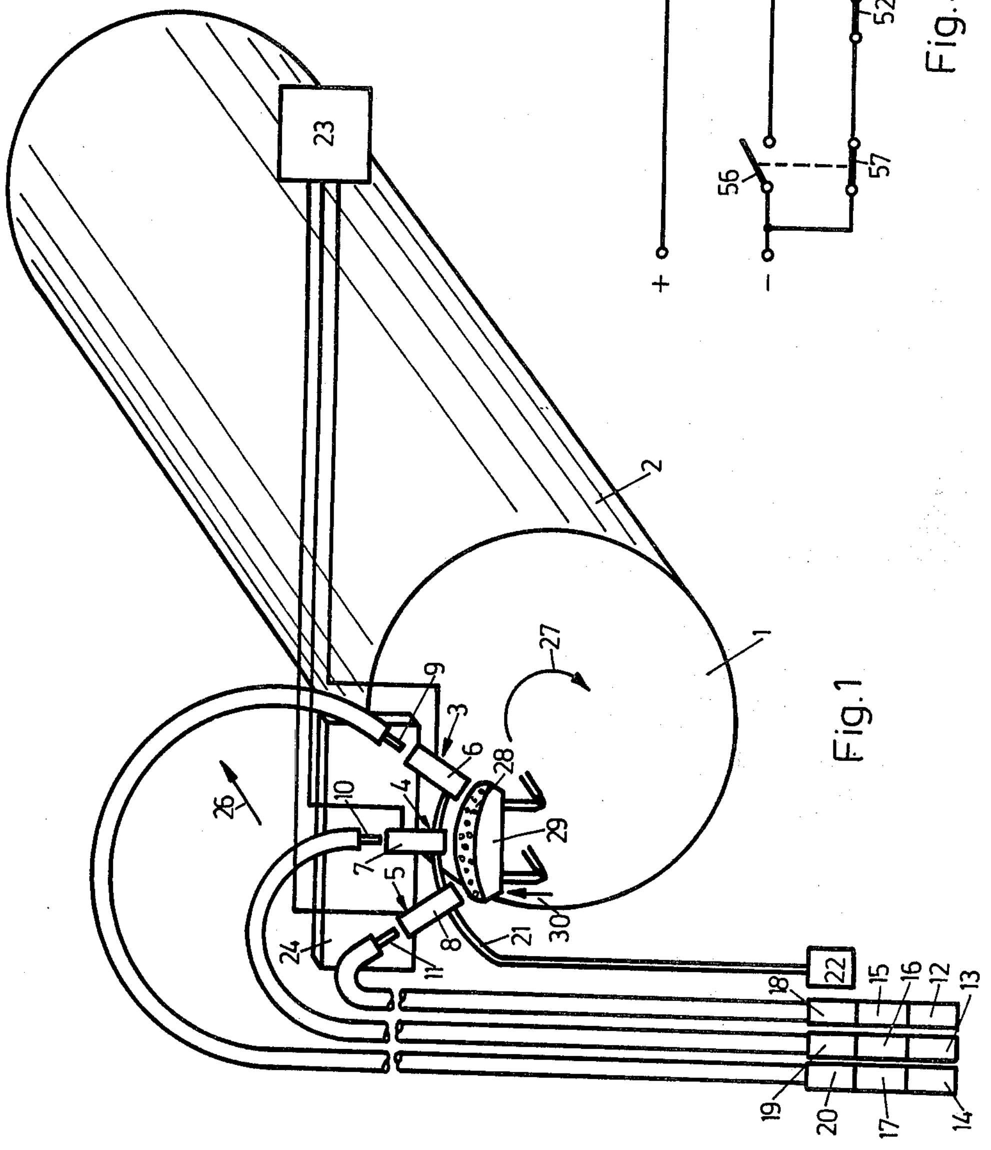
FIG. 1 is a schematic illustration of a jet beam recorder pursuant to the present invention.

The fluid or liquid jet recorder, as shown in FIG. 1, includes a drum 1 on which there is stretched or mounted a recording carrier 2 constituted of a sheet of paper. For recording there are employed three recording or scribing systems 3 through 5 which, respectively, consist of a control electrode 6 through 8, and a jet nozzle 9 through 11. The jet nozzles 9 through 11 project the required recording liquid from supply receptacles 12 through 14 through the use of pumps 15 through 17, through the control electrodes 6 through 8. Between the jet nozzles 9 through 11 and pumps 15 through 17 there may also be, respectively, positioned pressure regulators 18 through 20.

The three recording systems serve for the recording or inscribing of three varied colors, for example, the colors blue, red and yellow, so that a colored image is inscribed on the recording carrier 2. The control electrodes 6 through 8 are passed through by the liquid jet ejected from jet nozzles 9 through 11. These liquid jets disintegrate into drops within the tubularly-shaped control electrodes so that, upon application of a high voltage between the control electrodes and the recording liquid, there is produced a vapor cloud. This vapor cloud precipitates on the control electrodes, the latter of which are formed of a porous material, and are then aspirated by a suction conduit 21 through the intermediary of a suction pump 22. The control impulses for the control electrodes 6 through 8 emanate from a control installation 23. If a control impulse is lacking, then a color point is generated on the recording carrier 2; however, if a control impulse is present, then the flow of liquid between the respective jet nozzles 9 through 11 and the recording carrier 2 is interrupted.

The recording systems 3 through 5 are fastened onto a plate 24 which is longitudinally displaceably supported on two rails 25. The recording systems 3 through 5 and the plate 24, in the position shown in FIG. 1, are illustrated in their inactive position away from the recording carrier 2. The recording is carried out in a manner wherein the plate 24 is uniformly moved along rails 25 in the direction of arrow 26 over the entire length of the drum, while the drum 1 is uniformly rotated in the direction of arrow 27, or reversely. The recording thus is effected in a helix-like path on the recording carrier 2. The signals of the control installation 23 contain the image information.

After the completion of a recording or inscription, the plate 24 together with the recording systems 3 through 5 is again moved back into the illustrated inactive or initial position.

In order that residuals or excesses of the recording liquid may be removed from the recording systems 3 through 5, there is provided a suction pad 28 which is supported in a pan 29, and which is commonly associated with the control electrodes 6 through 8. The pan 29 is movable in the direction of arrow 30 in such a manner, whereby the suction pad 28 may be pressed against the jet output sides of the electrodes 6 through 8.

Figure 2:
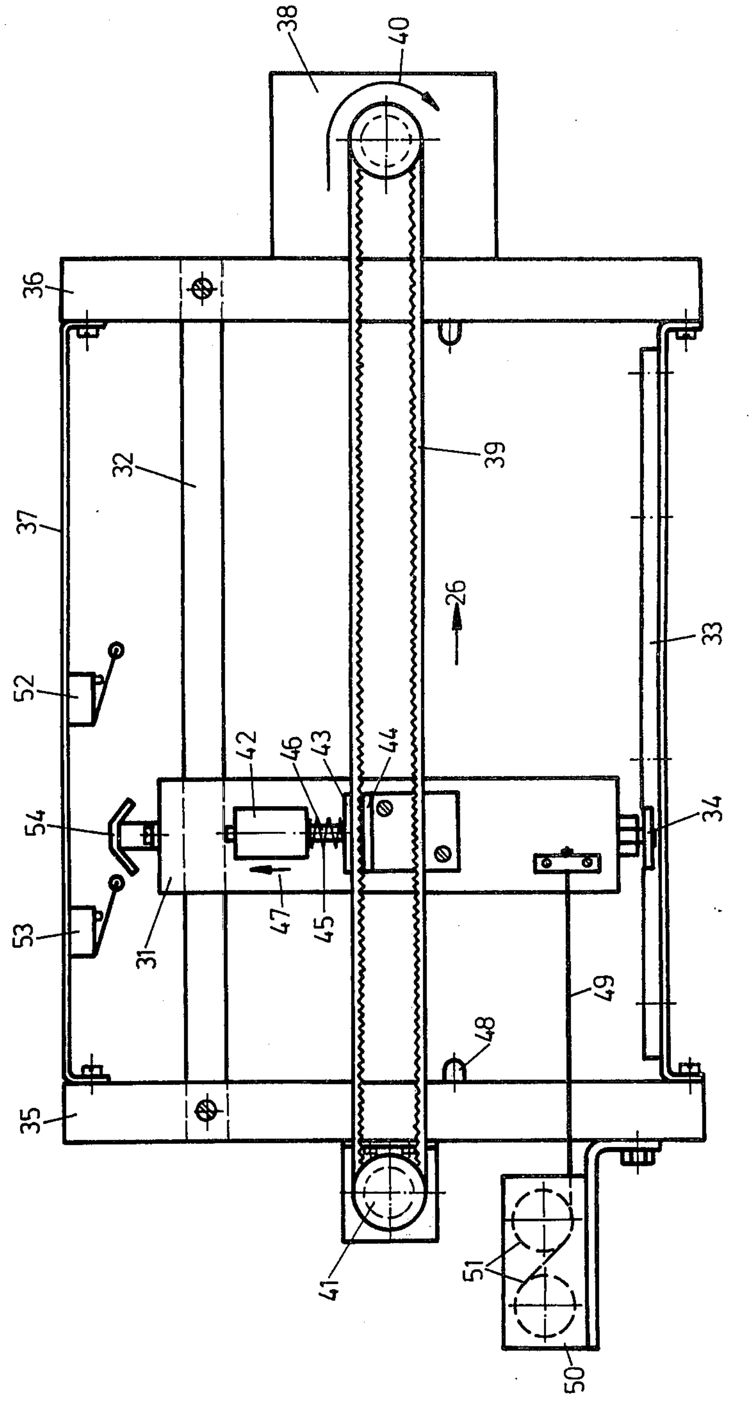
FIG. 2 is a guidance and actuating means for the recorder carriage of the liquid jet recorder of FIG. 1.

The actuating means for the recorder carriage, which consists of components 3 through 5 and 24, are more precisely illustrated in FIG. 2. The plate 24, which is not visible in FIG. 2, is fastened to a traveling carriage 31, which is longitudinally movably supported in a rail 32 and in a rail 33 by means of rollers. Of these rollers, in FIG. 2 only roller 34 is visible. Rails 32 and 33 are fastened to two support plates 35 and 36, which are connected to each other by means of an arm 37. The support plate 36 carries a drive 38 adapted to be driven by an electromotor, by means of which a toothed belt 39 is movable in the direction of arrow 40. The electromotor, and consequently also the toothed belt 39, have only one directin of conveyance. The toothed belt 39 is guided around a reversing roller 41 which is connected with the support plate 35. The toothed belt 39 extends in the direction of arrow 26 (FIG. 1), in effect, in parallel with the longitudinal axis of drum 1.

For movement of the traveling carriage 31 in the rails 32 and 33, the carriage is connected to the toothed belt 39. For this purpose, there serves an electrical coupling magnet 42 which is fastened to the traveling carriage 31, and which operates in conjunction with two coupling plates 43 and 44. The plate 44 is rigidly connected with the traveling carriage 31, whereas plate 43, by means of a spring 45 is pressed against the toothed belt 39 when the coupling magnet 42 is not excited. The toothed belt 39, in effect, is positioned between the plates 43 and 44. If the coupling magnet 42 is excited, then it pulls the pin 46 in the direction of arrow 47 and displaces the plate 43 from the toothed belt 39 so that an uncoupling is carried out between the traveling carriage 31 and the toothed belt 39.

The recorder carriage is located in its initial position when the traveling carriage 31 is in contact with a rubber bumper 48. For the recording of an image, the coupling magnet 42 is switched so as to be currentless, whereby the springs 45 clamp the toothed belt 39 between the plates 43 and 44. The toothed belt 39 then pulls along the recorder carriage until the latter reaches its end position, meaning that the carriage has been moved along the entire length of the drum. In this end position, in which the traveling carriage 31 lies in proximity to the support plate 36, the coupling magnet 42 is excited and uncouples the traveling carriage, and thereby the recorder carriage, from the toothed belt 39. If the image which is to be recorded does not require the entire length of the drum, it may also be previously uncoupled.

For effecting the return conveyance of the recorder carriage from the end position into the initial position there is provided a return member 49 fastened to the traveling carriage 31, which is tensioned by means of a linear spiral spring 41 supported in a housing 50. The spring 51 is tensioned upon motion of the recorder carriage in the direction of arrow 26 from the initial position to the end position. Upon uncoupling of the recorder carriage in the end position, the spring 51 pulls the recorder carriage by means of the return 49 back again into the initial position. Upon attaining the initial position, the traveling carriage 31 impacts against the rubber bumper 48.

In order to avoid shocks and consequent disturbances of the apparatus upon impact of the traveling carriage 31 with the rubber bumper 48 upon reconveyance, on the arm 34 are fastened two switches 52 and 53, which are stationary with respect to the recorder carriage, and which are actuatable by means of a switching lever 54 which is connected with the traveling carriage 31. Upon actuation of the switches 52 and 53, the coupling magnet 42 becomes currentless, in effect, the traveling carriage 31 is coupled to the toothed belt 39. The switches 52 and 53 are so arranged that upon reconveyance of the recorder carriage from the end position to the initial position, shortly before reaching the initial position, two times after each other there is effected a short term coupling of the recorder carriage to the toothed belt 39 and braking is achieved thereby. Thereby shocks are prevented through a too strong impact with the rubber bumper 48.

Figure 3:
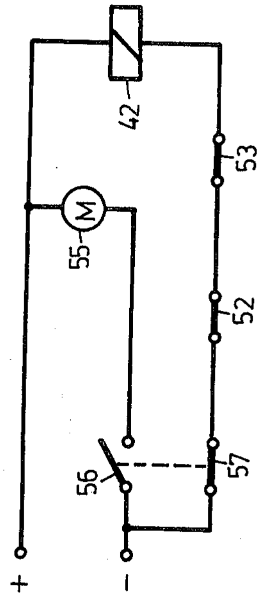
FIG. 3 is a circuit diagram for effecting the operation of the guidance and actuating means of FIG. 2.

With respect to FIG. 3, there is described in more precise detail the braking of the recorder carriage during the reconveyance thereof. In FIG. 3 the coupling magnet 42 is schematically illustrated. Furthermore, the electromotor 55 which drives the toothed belt 39 through the drive 38 is illustrated. The electromotor 55 and the coupling magnet 52 are switchable to a supply voltage source across two jointly actuatable switches 56 and 57. In FIG. 3, further illustrated are also the switches 52 and 53, in a schematic manner.

For recording of an image, meaning for effecting movement of the recorder carriage from its initial position, in which the traveling carriage 31 contacts the rubber bumper 48, into its end position in which the traveling carriage 31 lies proximate to the support plate 36, the switches 56 and 57 are jointly actuated. The switch 56 herein applies a voltage to the motor 55 so that the toothed belt 39 commences running. The switch 57 which is thereby opened, renders the coupling magnet 42 currentless, so that the toothed belt 39 is clamped between plates 43 and 44 and thereby the recorder carriage is coupled to the toothed belt 39.

Upon reaching the end position, the switches 56 and 57 are again jointly moved into their illustrated position, meaning, that the motor 55 is switched off and coupling magnet 42 excited, so that the recorder carriage is uncoupled from the toothed belt 39. The spring 51, which has been tensioned during the image recording, now pulls, by means of the return member 49, the recorder carriage from the end position back into the initial position. Shortly before the initial position, the switch 52 is opened by means of the switching pin 54, and in a short period renders the coupling magnet 42 currentless. Thereby, the recorder carriage is coupled to the toothed belt 39 and braked, inasmuch as due to the switched-off motor 55, the toothed gear 39 is maintained stationary. The same sequence is repeated when the pin 54 reaches the switch 53. When the traveling carriage 31 impacts against the rubber bumper 48, it has been braked so far that undesirable shocks of the entire apparatus no longer occur.

While there has been shown what is considered to be the preferred embodiment of the invention, it will be obvious that modifications may be made which come within the scope of the disclosure of the specification.

What is claimed is:

1. In a liquid jet recorder having at least one jet nozzle; a pressure means conduit connected to said jet nozzle for causing the latter to propel a jet of an electrically-conductive recording liquid onto a recording carrier; at least one control electrode encompassing said liquid jet disintegrating into drops; a signal source for imparting a charge to said drops for effecting mutual repelling and disintegration into a vapor cloud; means for producing relative movement between said jet nozzle and said recording carried in two mutually perpendicular directions for producing a linewise image recording; a pair of rails; a recorder carriage movable along said rails, said jet nozzle and control electrode constituting a recording unit forming a component of said recorder carriage; and an electromotor adapted to have said recorder carriage coupled thereto for conveyance thereof within a predetermined range; said recording carrier being limited to movement perpendicular to the direction of movement of said recorder carriage; the improvement comprising: a conveying belt adapted to be driven by said electromotor; an electrical coupling magnet for coupling said recorder carriage to said conveying belt, said motor driving said belt in one conveying direction into an end position of said recorder carriage; spring-loaded return means having a spring tensioned upon movement of said carriage toward the end position, said return means reconveying said recorder carriage into its initial position upon reaching the end position; means for controlling said coupling magnet so as to effect uncoupling of said recorder carriage from said conveying belt upon reaching said end position; and at least one switch for actuating said coupling magnet during reconveyance of said recorder carriage from the end position into the initial position shortly before reaching the initial position so as to effect coupling of said recorder carriage to said conveying belt for braking of the former.

2. A recorder as claimed in claim 1, comprising means for deactivating said drive motor for said conveying belt upon reaching said end position.

* * * * *